United States Patent
Lee et al.

(10) Patent No.: US 11,518,879 B2
(45) Date of Patent: Dec. 6, 2022

(54) THERMOPLASTIC RESIN COMPOSITION AND LIGHT DIFFUSION SHEET PRODUCED THEREFROM

(71) Applicant: LOTTE CHEMICAL CORPORATION, Seoul (KR)

(72) Inventors: Sang Hoon Lee, Uiwang-si (KR); Tae Gon Kang, Uiwang-si (KR); Eun Taek Woo, Uiwang-si (KR); Da Heen Jeong, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 139 days.

(21) Appl. No.: 16/882,912

(22) Filed: May 26, 2020

(65) Prior Publication Data

US 2020/0377721 A1 Dec. 3, 2020

(30) Foreign Application Priority Data

May 31, 2019 (KR) .......................... 10-2019-0064496
Dec. 6, 2019 (KR) .......................... 10-2019-0161718

(51) Int. Cl.
| | | |
|---|---|---|
| *C08L 69/00* | (2006.01) | |
| *C08L 33/12* | (2006.01) | |
| *C08L 25/14* | (2006.01) | |
| *C08L 33/10* | (2006.01) | |
| *G02B 5/02* | (2006.01) | |

(52) U.S. Cl.
CPC .............. *C08L 69/00* (2013.01); *C08L 25/14* (2013.01); *C08L 33/10* (2013.01); *G02B 5/0242* (2013.01); *C08L 2205/22* (2013.01)

(58) Field of Classification Search
None
See application file for complete search history.

(56) References Cited

U.S. PATENT DOCUMENTS

| | | | |
|---|---|---|---|
| 2007/0054983 A1* | 3/2007 | Pudleiner | B32B 27/18 524/155 |
| 2008/0113117 A1 | 5/2008 | Coenjarts et al. | |
| 2017/0115434 A1* | 4/2017 | Machida | F21V 3/0625 |
| 2018/0273696 A1 | 9/2018 | Goto et al. | |

FOREIGN PATENT DOCUMENTS

| | | | |
|---|---|---|---|
| EP | 3357934 A1 | | 8/2018 |
| JP | 04328148 | * | 11/1992 |
| JP | 4913629 B2 | | 4/2012 |
| JP | 2012-230364 A | | 11/2012 |
| JP | 2016170907 | * | 9/2016 |
| KR | 10-2005-0121336 A | | 12/2005 |
| KR | 10-2016-0141078 A | | 12/2016 |

OTHER PUBLICATIONS

Extended Search Report in counterpart European Application No. 20174657.5 dated Sep. 2, 2020, pp. 1-7.

* cited by examiner

*Primary Examiner* — David J Buttner
(74) *Attorney, Agent, or Firm* — Additon, Pendleton & Witherspoon, P.A.

(57) ABSTRACT

A thermoplastic resin composition comprises about 100 parts by weight of a polycarbonate resin; and about 0.5 parts by weight to about 3 parts by weight of polystyrene-poly (methyl methacrylate) copolymer particles, wherein the polystyrene-poly(methyl methacrylate) copolymer particles include about 41 wt % to about 59 wt % of polystyrene and about 41 wt % to about 59 wt % of poly(methyl methacrylate) and have an average particle diameter of about 3 μm to about 9 μm and a coefficient of variation (CV) of about 20% to about 40%. The thermoplastic resin composition can have good properties in terms of light transmission, light diffusion and balance therebetween.

8 Claims, No Drawings

THERMOPLASTIC RESIN COMPOSITION AND LIGHT DIFFUSION SHEET PRODUCED THEREFROM

CROSS-REFERENCE TO RELATED APPLICATION

This application claims priority under 35 USC Section 119 to and the benefit of Korean Patent Application No. 10-2019-0064496, filed May 31, 2019, and Korean Patent Application No. 10-2019-0161718, filed Dec. 6, 2019, the entire disclosure of each of which is incorporated herein by reference.

FIELD

The present invention relates to a thermoplastic resin composition and a light diffusion sheet produced therefrom.

BACKGROUND

In general, since light emitted from a light emitting device (LED) has strong linearity, a lighting apparatus using the light emitting device is provided with a light diffusion sheet to disperse the light emitted from the LED.

A typical light diffusion sheet (cover) for lighting is mainly composed of a polycarbonate resin in order to secure transparency, formability and flame retardancy, and further includes a silicone or acrylic light diffusing agent dispersed in the polycarbonate resin in order to improve dispersion of light.

However, a typical light diffusion sheet has a limitation in use for lighting due to decrease in light transmittance with increasing degree of light spreading.

Therefore, there is a need for a thermoplastic resin composition having good properties in terms of light transmission, light diffusion and balance therebetween, and a light diffusion sheet for lighting produced therefrom.

SUMMARY OF THE INVENTION

The present disclosure relates to a thermoplastic resin composition that can have good properties in terms of light transmission, light diffusion and balance therebetween, and a light diffusion sheet produced therefrom.

The thermoplastic resin composition includes: about 100 parts by weight of a polycarbonate resin; and about 0.5 parts by weight to about 3 parts by weight of polystyrene-poly(methyl methacrylate) copolymer particles, wherein the polystyrene-poly(methyl methacrylate) copolymer particles include about 41 wt % to about 59 wt % of polystyrene and about 41 wt % to about 59 wt % of poly(methyl methacrylate) and have an average particle diameter of about 3 μm to about 9 μm and a coefficient of variation (CV) of about 20% to about 40%, as calculated by Equation 1:

$$\text{Coefficient of variation (CV)} = [\sigma/M] \times 100\% \quad \text{[Equation 1]}$$

where M is an average particle diameter of the copolymer particles and σ is a standard deviation of particle diameters of the copolymer particles.

The polycarbonate resin may have a weight average molecular weight of about 20,000 g/mol to about 30,000 g/mol.

The thermoplastic resin composition may have a transmittance of about 96% or more and a transmittance of about 92% or more, as measured on a 1.0 mm thick specimen and a 2.0 mm thick specimen in accordance with ASTM D1003, respectively.

The thermoplastic resin composition may have a luminosity angle of about 3° to about 20° corresponding to half of luminosity at 0°, as measured on a 1.0 mm thick specimen using a goniophotometer, and a luminosity angle of about 10° to about 30° corresponding to half of luminosity at 0°, as measured on a 2.0 mm thick specimen using the goniophotometer.

The present disclosure also relates to a light diffusion sheet. The light diffusion sheet is formed of the thermoplastic resin composition.

The light diffusion sheet may include a light diffusing agent dispersed in a polycarbonate resin matrix. The light diffusing agent may include polystyrene-poly(methyl methacrylate) copolymer particles. The polystyrene-poly(methyl methacrylate) copolymer particles may have an average particle diameter of about 3 μm to about 9 μm and a coefficient of variation (CV) of about 20% to about 40%, as calculated by Equation 1:

$$\text{Coefficient of variation (CV)} = [\sigma/M] \times 100\% \quad \text{[Equation 1]}$$

where M is an average particle diameter of the copolymer particles and σ is a standard deviation of particle diameters of the copolymer particles.

The light diffusion sheet may include about 100 parts by weight of the polycarbonate resin matrix; and about 0.5 parts by weight to about 3 parts by weight of the light diffusing agent.

The light diffusion sheet may have a transmittance of about 96% or more and a transmittance of about 92% or more, as measured on a 1.0 mm thick specimen and a 2.0 mm thick specimen in accordance with ASTM D1003, respectively.

The light diffusion sheet may have a luminosity angle of about 3° to about 20° corresponding to half of luminosity at 0°, as measured on a 1.0 mm thick specimen using a goniophotometer, and a luminosity angle of about 10° to about 30° corresponding to half of luminosity at 0°, as measured on a 2.0 mm thick specimen using the goniophotometer.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

A thermoplastic resin composition according to the present invention includes: (A) a polycarbonate resin; and (B) polystyrene-poly(methyl methacrylate) copolymer particles.

As used herein to represent a specific numerical range, the expression "a to b" means "≥a and ≤b".

(A) Polycarbonate Resin

The polycarbonate resin according to embodiments of the present disclosure may be a polycarbonate resin used in typical thermoplastic resin compositions. For example, the polycarbonate resin may be an aromatic polycarbonate resin obtained by reacting a precursor, such as phosgene, halogen formate, and/or carbonic diester, with diphenol(s) (aromatic diol compounds).

Examples of the diphenols may include 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, and the like, and mixtures and/or combinations thereof, without being limited thereto. For example, the diphenols may include 2,2-bis(4-hydroxyphenyl)propane, 2,2-bis(3,5-dichloro-4-hydroxyphenyl)propane, and/or 1,1-bis(4-hydroxyphenyl)cyclohexane, for example 2,2-bis-(4-hydroxyphenyl)propane, which is also referred to as bisphenol A.

The polycarbonate resin may be a branched polycarbonate resin. For example, the polycarbonate resin may be a branched polycarbonate resin obtained by adding about 0.05 mol % to about 2 mol % of a tri- or higher polyfunctional compound, for example, a tri- or higher valent phenol group-containing compound, based on the total number of moles of the diphenols used in polymerization.

The polycarbonate resin may be a homopolycarbonate resin, a copolycarbonate resin, or a blend thereof. The polycarbonate resin may be partially or completely replaced by an aromatic polyester-carbonate resin obtained by polymerization in the presence of an ester precursor, for example, a bifunctional carboxylic acid.

The polycarbonate resin may have a weight average molecular weight (Mw) of about 20,000 g/mol to about 30,000 g/mol, for example, about 20,000 g/mol to about 25,000 g/mol, as measured by gel permeation chromatography (GPC). Within this range, the thermoplastic resin composition can have good flowability (processability), and the like.

The polycarbonate resin may have a melt-flow index (MI) of about 10 g/10 min to about 40 g/10 min, as measured under conditions of 300° C. and a load of 1.2 kgf in accordance with ISO 1133. In addition, the polycarbonate resin may be a mixture of two or more polycarbonate resins having different melt-flow indexes.

(B) Polystyrene-Poly(Methyl Methacrylate) Copolymer Particles

The polystyrene-poly(methyl methacrylate) copolymer particles are used together with the polycarbonate resin to improve light transmittance and light diffusion. The polystyrene-poly(methyl methacrylate) copolymer particles may be prepared using methods of preparing typical polystyrene-poly(methyl methacrylate) copolymer particles, in which styrene and methyl methacrylate are mixed and polymerized by a polymerization method known in the art.

In the polystyrene-poly(methyl methacrylate), the polystyrene may be present in an amount of about 41 wt % to about 59 wt %, for example, about 45 wt % to about 55 wt %, and the poly(methyl methacrylate) may be present in an amount of about 41 wt % to about 59 wt %, for example, about 45 wt % to about 55 wt %.

In some embodiments, the polystyrene-poly(methyl methacrylate) copolymer can include the polystyrene in an amount of about 41, 42, 43, 44, 45, 46, 47, 48, 49, 50, 51, 52, 53, 54, 55, 56, 57, 58, or 59 wt % based on 100 wt % of the polystyrene-poly(methyl methacrylate) copolymer. Further, according to some embodiments, the polystyrene can be present in an amount of from about any of the foregoing amounts to about any other of the foregoing amounts.

In some embodiments, the polystyrene-poly(methyl methacrylate) copolymer can include the poly(methyl methacrylate) in an amount of about 41, 42, 43, 44, 45, 46, 47, 48, 49, 50, 51, 52, 53, 54, 55, 56, 57, 58, or 59 wt % based on 100 wt % of the polystyrene-poly(methyl methacrylate) copolymer. Further, according to some embodiments, the poly(methyl methacrylate) can be present in an amount of from about any of the foregoing amounts to about any other of the foregoing amounts.

If the content of the polystyrene is less than about 41 wt % (if the content of the poly(methyl methacrylate) exceeds about 59 wt % in the polystyrene-poly(methyl methacrylate) copolymer particles), the thermoplastic resin composition can suffer from deterioration in transmittance, and if the content of the polystyrene exceeds about 59 wt % (if the content of the poly(methyl methacrylate) is less than about 41 wt %), the thermoplastic resin composition can suffer from deterioration in light transmittance and light diffusion.

The polystyrene-poly(methyl methacrylate) copolymer particles may have an average particle diameter (D50) of about 3 μm to about 9 μm, for example, about 4 μm to about 7 μm, as measured using a particle size analyzer known in the art (e.g., Manufacturer: Beckman Coulter, Model: Multisizer 4) using methods/techniques also known in the art and as understood by the skilled artisan. In some embodiments, the polystyrene-poly(methyl methacrylate) copolymer particles may have an average particle diameter (D50) of about 3, 4, 5, 6, 7, 8, or 9 m.

The polystyrene-poly(methyl methacrylate) copolymer particles may have a coefficient of variation (CV) of about 20% to about 40%, for example, about 30% to about 40%, as calculated by Equation 1:

$$\text{Coefficient of variation (CV)} = [\sigma/M] \times 100\% \qquad \text{[Equation 1]}$$

where M is an average particle diameter of the copolymer particles and a is a standard deviation of particle diameters of the copolymer particles.

In some embodiments, the polystyrene-poly(methyl methacrylate) copolymer particles may have a coefficient of variation (CV) of about 20%, 21%, 22%, 23%, 24%, 25%, 26%, 27%, 28%, 29%, 30%, 31%, 32%, 33%, 34%, 35%, 36%, 37%, 38%, 39%, or 40%.

If the average particle diameter of the polystyrene-poly(methyl methacrylate) copolymer particles is less than about 3 μm, the thermoplastic resin composition can suffer from deterioration in light diffusion, and if the average particle diameter of the polystyrene-poly(methyl methacrylate) copolymer particles exceeds about 9 μm, the thermoplastic resin composition can suffer from deterioration in light transmittance and light diffusion.

If the coefficient of variation of the polystyrene-poly(methyl methacrylate) copolymer particles is less than about 20, the thermoplastic resin composition can suffer from deterioration in light transmittance and light diffusion, and if the coefficient of variation of the polystyrene-poly(methyl methacrylate) copolymer particles exceeds about 40, the thermoplastic resin composition can suffer from deterioration in light transmittance and light diffusion.

The polystyrene-poly(methyl methacrylate) copolymer particles may have a weight average molecular weight (Mw) of about 20,000 g/mol to about 30,000 g/mol, for example, about 20,000 g/mol to about 25,000 g/mol, as measured by gel permeation chromatography (GPC). Within this range, the thermoplastic resin composition can exhibit good optical characteristics and thermal stability.

The polystyrene-poly(methyl methacrylate) copolymer particles may be present in an amount of about 0.5 parts by weight to about 3 parts by weight, for example, about 1 part by weight to about 2 parts by weight, relative to about 100 parts by weight of the polycarbonate resin. In some embodiments, the thermoplastic resin composition can include the polystyrene-poly(methyl methacrylate) copolymer particles in an amount of about 0.5, 0.6, 0.7, 0.8, 0.9, 1, 1.5, 2, 2.5, or 3 parts by weight based on about 100 parts by weight of the polycarbonate resin. Further, according to some embodiments, the polystyrene-poly(methyl methacrylate) copolymer particles can be present in an amount of from about any of the foregoing amounts to about any other of the foregoing amounts.

If the content of the polystyrene-poly(methyl methacrylate) copolymer particles is less than about 0.5 parts by weight, the thermoplastic resin composition can suffer from deterioration in light transmittance and light diffusion, and if the content of the polystyrene-poly(methyl methacrylate) copolymer particles exceeds about 3 parts by weight, the thermoplastic resin composition can suffer from deterioration in light transmittance and light diffusion.

The thermoplastic resin composition may optionally further include one or more additives used in typical thermoplastic resin compositions. Examples of the additives may include antioxidants, lubricants, flame retardants, anti-dripping agents, release agents, nucleating agents, stabilizers, pigments, dyes, and the like, and mixtures and/or combinations thereof, without being limited thereto. The additives may be present in an amount of about 0.001 parts by weight to about 40 parts by weight, for example, about 0.1 about 10 parts by weight, relative to about 100 parts by weight of the polycarbonate resin.

The thermoplastic resin composition may be prepared in pellet form by mixing the aforementioned components, followed by melt extrusion using a typical twin-screw extruder at about 220° C. to about 300° C., for example, about 240° C. to about 280° C.

The thermoplastic resin composition (light diffusion sheet) may have a transmittance of about 96% or more, for example, about 96% to about 98%, and a transmittance of about 92% or more, for example, about 92% to about 97%, as measured on a 1.0 mm thick specimen and a 2.0 mm thick specimen in accordance with ASTM D1003, respectively. In some embodiments, the thermoplastic resin composition (light diffusion sheet) may have a transmittance of about 96%, 97%, or 98%, and a transmittance of about 92%, 93%, 94%, 95%, 96%, or 97%, as measured on a 1.0 mm thick specimen and a 2.0 mm thick specimen in accordance with ASTM D1003, respectively.

The thermoplastic resin composition may have a luminosity angle of about 3° to about 20°, for example, about 5° to about 17°, corresponding to half of luminosity at 0°, as measured on a 1.0 mm thick specimen using a goniophotometer, and a luminosity angle of about 10° to about 30°, for example, about 12° to about 26°, corresponding to half of luminosity at 0°, as measured on a 2.0 mm thick specimen using the goniophotometer.

Luminosity angle is measured using a goniophotometer as known in the art and methods also as known in the art, and as understood by the skilled artisan. In some embodiments, the thermoplastic resin composition may have a luminosity angle of about 3°, 4°, 5°, 6°, 7°, 8°, 9°, 10°, 11°, 12°, 13°, 14°, 15°, 16°, 17°, 18°, 19°, or 20°, corresponding to half of luminosity at 0°, as measured on a 1.0 mm thick specimen using a goniophotometer, and a luminosity angle of about 10°, 11°, 12°, 13°, 14°, 15°, 16°, 17°, 18°, 19°, 20°, 21°, 22°, 23°, 24°, 25°, 26°, 27°, 28°, 29°, or 30°, corresponding to half of luminosity at 0°, as measured on a 2.0 mm thick specimen using the goniophotometer.

A light diffusion sheet according to the present disclosure is formed of the thermoplastic resin composition. The thermoplastic resin composition may be prepared in pellet form and the prepared pellets may be produced into various light diffusion sheets (products) by various molding methods, such as injection molding, extrusion molding, vacuum molding, and casting. Such molding methods are well known to those skilled in the art. The light diffusion sheet may have good properties in terms of light transmission, light diffusion and balance therebetween, and may be useful as interior and/or exterior materials for electric and/or electronic products, diffusion sheets of lighting products, and the like.

The light diffusion sheet includes a polycarbonate resin matrix and a light diffusing agent dispersed in the polycarbonate resin matrix. The light diffusing agent may include the polystyrene-poly(methyl methacrylate) copolymer particles.

The light diffusion sheet may include about 100 parts by weight of the polycarbonate resin matrix; and about 0.5 to about 3 parts by weight, for example, about 1 to about 2 parts by weight, of the light diffusing agent. In some embodiments, the light diffusion sheet can include the light diffusing agent in an amount of about 0.5, 0.6, 0.7, 0.8, 0.9, 1, 1.5, 2, 2.5, or 3 parts by weight based on about 100 parts by weight of the polycarbonate resin matrix. Further, according to some embodiments, the light diffusing agent can be present in an amount of from about any of the foregoing amounts to about any other of the foregoing amounts.

Within these ranges, the light diffusion sheet can have good light transmittance, light diffusion, and balance therebetween.

Next, the present invention will be described in more detail with reference to the following examples. It should be understood that these examples are provided for illustration only and are not to be in any way construed as limiting the present invention.

Example

Details of each component used in Examples and Comparative Examples are as follows:

(A) Polycarbonate Resin

A bisphenol A-based polycarbonate resin (weight average molecular weight: 23,000 g/mol) is used.

(B) Polystyrene-Poly(Methyl Methacrylate) Copolymer Particles (B1) Polystyrene-poly(methyl methacrylate) copolymer particles (Manufacturer: ASP, Product Name MS-5FDB, 50 wt % of polystyrene and 50 wt % of poly(methyl methacrylate), average particle diameter: 5.0 μm, coefficient of variation (CV): 35%) are used.

(B2) In a four-neck flask reactor, 45 wt % of styrene is mixed with 55 wt % of methyl methacrylate under a nitrogen atmosphere, and 300 mL of an aqueous solution prepared by dissolving 4 parts by weight of potassium persulfate in water is added to the mixture to react therewith for 6 hours when the temperature of the flask reached 70° C. Then, as a linker for forming a bond between polystyrenes, 20 parts by weight of ethylene glycol di(meth)acrylate (EGDMA) is mixed with the resulting mixture and homogenized using a homogenizer at 5,000 rpm for 5 minutes to prepare an emulsion, which in turn is polymerized for 24 hours. Thereafter, polystyrene-poly(methyl methacrylate) copolymer particles (45 wt % of polystyrene and 55 wt % of poly(methyl methacrylate), average particle diameter: 5.0 μm, coefficient of variation (CV): 35%) are prepared by filtering the polymerized product and washing the filtered product with water and an aqueous ethanol solution, followed by drying the filtered product in a vacuum oven for a day.

(B3) In a four-neck flask reactor, 55 wt % of styrene is mixed with 45 wt % of methyl methacrylate under a nitrogen atmosphere, and 300 mL of an aqueous solution prepared by dissolving 4 parts by weight of potassium persulfate in water is added to the mixture to react therewith for 6 hours when the temperature of the flask reached 70° C. Then, as a linker for forming a bond between polystyrenes, 25 parts by weight of ethylene glycol di(meth)acrylate (EGDMA) is mixed with the resulting mixture, followed by preparing polystyrene-poly(methyl methacrylate) copolymer particles (55 wt % of polystyrene and 45 wt % of poly(methyl methacrylate), average particle diameter: 5.0 μm, coefficient of variation (CV): 35%) in the same manner as in (B2).

(B4) In a four-neck flask reactor, 40 wt % of styrene is mixed with 60 wt % of methyl methacrylate under a nitrogen atmosphere, and 300 mL of an aqueous solution prepared by dissolving 4 parts by weight of potassium persulfate in water is added to the mixture to react therewith for 6 hours when the temperature of the flask reached 70° C. Then, as a linker for forming a bond between polystyrenes, 15 parts by weight of ethylene glycol di(meth)acrylate (EGDMA) is mixed with the resulting mixture, followed by preparing polystyrene-poly(methyl methacrylate) copolymer particles (40 wt % of polystyrene and 60 wt % of poly(methyl methacrylate), average particle diameter: 5.0 μm, coefficient of variation (CV): 35%) in the same manner as in (B2).

(B5) In a four-neck flask reactor, 60 wt % of styrene is mixed with 40 wt % of methyl methacrylate under a nitrogen atmosphere, and 300 mL of an aqueous solution prepared by dissolving 4 parts by weight of potassium persulfate in water is added to the mixture to react therewith for 6 hours when the temperature of the flask reached 70° C. Then, as a linker for forming a bond between polystyrenes, 30 parts by weight of ethylene glycol di(meth)acrylate (EGDMA) is mixed with the resulting mixture, followed by preparing polystyrene-poly(methyl methacrylate) copolymer particles (60 wt % of polystyrene and 40 wt % of poly(methyl methacrylate), average particle diameter: 5.0 μm, coefficient of variation (CV): 35%) in the same manner as in (B2).

(B6) In a four-neck flask reactor, 50 wt % of styrene is mixed with 50 wt % of methyl methacrylate under a nitrogen atmosphere, and 600 mL of an aqueous solution prepared by dissolving 4 parts by weight of potassium persulfate in water is added to the mixture to react therewith for 6 hours when the temperature of the flask reached 70° C. Then, as a linker for forming a bond between polystyrenes, 20 parts by weight of ethylene glycol di(meth)acrylate (EGDMA) is mixed with the resulting mixture and homogenized using a homogenizer at 8,000 rpm for 5 minutes to prepare an emulsion, which in turn is polymerized for 24 hours. Thereafter, polystyrene-poly(methyl methacrylate) copolymer particles (50 wt % of polystyrene and 50 wt % of poly(methyl methacrylate), average particle diameter: 2.0 μm, coefficient of variation (CV): 35%) are prepared by filtering the polymerized product and washing the filtered product with water and an aqueous ethanol solution, followed by drying the filtered product in a vacuum oven for a day.

(B7) In a four-neck flask reactor, 50 wt % of styrene is mixed with 50 wt % of methyl methacrylate under a nitrogen atmosphere, and 250 mL of an aqueous solution prepared by dissolving 4 parts by weight of potassium persulfate in water is added to the mixture to react therewith for 6 hours when the temperature of the flask reached 70° C. Then, as a linker for forming a bond between polystyrenes, 20 parts by weight of ethylene glycol di(meth)acrylate (EGDMA) is mixed with the resulting mixture and homogenized using a homogenizer at 4,000 rpm for 5 minutes to prepare an emulsion, which in turn is polymerized for 24 hours. Thereafter, polystyrene-poly(methyl methacrylate) copolymer particles (50 wt % of polystyrene and 50 wt % of poly(methyl methacrylate), average particle diameter: 10.0 μm, coefficient of variation (CV): 35%) are prepared by filtering the polymerized product and washing the filtered product with water and an aqueous ethanol solution, followed by drying the filtered product in a vacuum oven for a day.

(B8) In a four-neck flask reactor, 50 wt % of styrene is mixed with 50 wt % of methyl methacrylate under a nitrogen atmosphere, and 300 mL of an aqueous solution prepared by dissolving 4 parts by weight of potassium persulfate in water is added to the mixture to react therewith for 6 hours when the temperature of the flask reached 70° C. Then, as a linker for forming a bond between polystyrenes, 20 parts by weight of ethylene glycol di(meth)acrylate (EGDMA) is mixed with the resulting mixture and homogenized using a homogenizer at 6,000 rpm for 10 minutes to prepare an emulsion, which in turn is polymerized for 24 hours. Thereafter, polystyrene-poly(methyl methacrylate) copolymer particles (50 wt % of polystyrene and 50 wt % of poly(methyl methacrylate), average particle diameter: 5.0 μm, coefficient of variation (CV): 14%) are prepared by filtering the polymerized product and washing the filtered product with water and an aqueous ethanol solution, followed by drying the filtered product in a vacuum oven for a day.

(B9) In a four-neck flask reactor, 50 wt % of styrene is mixed with 50 wt % of methyl methacrylate under a nitrogen atmosphere, and 250 mL of an aqueous solution prepared by dissolving 4 parts by weight of potassium persulfate in water is added to the mixture to react therewith for 6 hours when the temperature of the flask reached 70° C. Then, as a linker for forming a bond between polystyrenes, 20 parts by weight of ethylene glycol di(meth)acrylate (EGDMA) is mixed with the resulting mixture and homogenized using a homogenizer at 3,000 rpm for 2 minutes to prepare an emulsion, which in turn is polymerized for 24 hours. Thereafter, polystyrene-poly(methyl methacrylate) copolymer particles (50 wt % of polystyrene and 50 wt % of poly(methyl methacrylate), average particle diameter: 5.0 μm, coefficient of variation (CV): 50%) are prepared by filtering the polymerized product and washing the filtered product with water and an aqueous ethanol solution, followed by drying the filtered product in a vacuum oven for a day.

(C) Acrylic Light Diffusing Agent

Poly(methyl methacrylate) particles (Manufacturer: ASP, Product Name MH-5FD) are used.

Examples 1 to 5 and Comparative Examples 1 to 9

The aforementioned components are mixed in amounts as listed in Tables 1 and 2, followed by extrusion at 250° C. to 280° C., thereby preparing a thermoplastic resin composition in pellet form. Here, extrusion is performed using a twin-screw extruder (L/D: 36, Φ: 45 mm). The prepared pellets are dried at 100° C. for 4 hours or more and then subjected to injection molding using a 6 oz. injection machine (molding temperature: 260° C., mold temperature: 60° C.), thereby preparing a specimen. The prepared specimen is evaluated as to the following properties. Results are shown in Tables 1 and 2.

Property Evaluation (1) Light transmittance: Transmittance (unit: %) is measured on each of a 1.0 mm thick specimen and a 2.0 mm thick specimen in accordance with ASTM D1003.

(2) Light diffusion: A luminosity angle (unit: °) corresponding to half of luminosity at 0° is measured on each of a 1.0 mm thick specimen and a 2.0 mm thick specimen using a goniophotometer (Manufacturer: NIPPON DENSHOKU, Product Name GC 5000L).

TABLE 1

|  | Example | | | | | Comparative Example | |
| --- | --- | --- | --- | --- | --- | --- | --- |
|  | 1 | 2 | 3 | 4 | 5 | 1 | 2 |
| (A) (parts by weight) | 100 | 100 | 100 | 100 | 100 | 100 | 100 |
| (B1) (parts by weight) | 1 | 1.5 | 2 | — | — | 0.4 | 4 |
| (B2) (parts by weight) | — | — | — | 1.5 | — | — | — |
| (B3) (parts by weight) | — | — | — | — | 1.5 | — | — |
| Transmittance (1.0 mm) | 97.4 | 97.5 | 97.1 | 96.6 | 96.4 | 93.2 | 91.5 |
| Transmittance (2.0 mm) | 95.7 | 93.1 | 92.4 | 92.7 | 92.9 | 91.5 | 81.5 |
| Diffusion (1.0 mm) | 5 | 14 | 17 | 12 | 15 | 0 | 22 |
| Diffusion (2.0 mm) | 12 | 23 | 26 | 26 | 24 | 2 | 37 |

TABLE 2

|  | Comparative Example | | | | | | |
| --- | --- | --- | --- | --- | --- | --- | --- |
|  | 3 | 4 | 5 | 6 | 7 | 8 | 9 |
| (A) (parts by weight) | 100 | 100 | 100 | 100 | 100 | 100 | 100 |
| (B4) (parts by weight) | 1.5 | — | — | — | — | — | — |
| (B5) (parts by weight) | — | 1.5 | — | — | — | — | — |
| (B6) (parts by weight) | — | — | 1.5 | — | — | — | — |
| (B7) (parts by weight) | — | — | — | 1.5 | — | — | — |
| (B8) (parts by weight) | — | — | — | — | 1.5 | — | — |
| (B9) (parts by weight) | — | — | — | — | — | 1.5 | — |
| (C) (parts by weight) | — | — | — | — | — | — | 1.5 |
| Transmittance (1.0 mm) | 93.0 | 95.0 | 93.2 | 91.2 | 93.0 | 91.0 | 91.2 |
| Transmittance (2.0 mm) | 90.0 | 91.0 | 89.5 | 87.0 | 90.2 | 90.2 | 80.0 |
| Diffusion (1.0 mm) | 10 | 8 | 8 | 0 | 3 | 0 | 10 |
| Diffusion (2.0 mm) | 32 | 22 | 12 | 1 | 5 | 0 | 35 |

From the results, the thermoplastic resin compositions according to the present disclosure have good properties in terms of light transmittance, light diffusion, and balance therebetween.

In contrast, the resin composition (Comparative Example 1) containing less of the polystyrene-poly(methyl methacrylate) copolymer particles than that of the present disclosure suffers from deterioration in light transmittance and light diffusion, and the resin composition (Comparative Example 2) containing a greater amount of the polystyrene-poly(methyl methacrylate) copolymer particles than that of the present disclosure suffers from deterioration in light transmittance and light diffusion. In addition, the resin composition of Comparative Example 3 prepared using the polystyrene-poly(methyl methacrylate) copolymer particles (B4) comprising lower amounts of polystyrene and higher amounts of poly(methyl methacrylate) than that of the present disclosure suffers from deterioration in light transmittance and light diffusion; the resin composition of Comparative Example 4 prepared using the polystyrene-poly (methyl methacrylate) copolymer particles (B5) comprising higher amounts of polystyrene and lower amounts of poly (methyl methacrylate) than that of the present disclosure suffers from deterioration in light transmittance; the resin composition of Comparative Example 5 prepared using the polystyrene-poly(methyl methacrylate) copolymer particles (B6) having a smaller average particle diameter than that of the present disclosure suffers from deterioration in light transmittance; the resin composition of Comparative Example 6 prepared using the polystyrene-poly(methyl methacrylate) copolymer particles (B7) having a larger average particle diameter than that of the present disclosure suffers from deterioration in light transmittance and light diffusion; the resin composition of Comparative Example 7 prepared using the polystyrene-poly(methyl methacrylate) copolymer particles (B8) having a smaller CV value than that of the present disclosure suffers from deterioration in light transmittance and light diffusion; the resin composition of Comparative Example 8 prepared using the polystyrene-poly(methyl methacrylate) copolymer particles (B9) having a greater CV value than that of the present disclosure suffers from deterioration in light transmittance and light diffusion; and the resin composition of Comparative Example 9 prepared using the poly(methyl methacrylate) particles (C) instead of the polystyrene-poly(methyl methacrylate) copolymer particles (B1) suffers from deterioration in light transmittance and light diffusion.

All numerical values and percentages provided throughout this disclosure can be approximate, and for each range specified in this disclosure, all values within the range and all subranges within the range are also disclosed. Approximate values and percentages can be calculated, and it is believed that each weight percentage can vary by plus or minus about 25%, plus or minus about 20%, plus or minus about 15%, plus or minus about 10%, plus or minus about 5%, plus or minus about 1%, or less than about 1%, including all values and subranges therebetween for each of the above ranges.

It is within the scope of this disclosure for one or more of the terms "substantially," "about," "approximately," and/or the like, to qualify each adjective and adverbs of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items.

Exemplary embodiments have been disclosed herein, and although specific terms are employed, unless otherwise noted, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A thermoplastic resin composition comprising:
about 100 parts by weight of a polycarbonate resin; and
about 0.5 parts by weight to about 3 parts by weight of particles comprising a copolymer of styrene and methyl methacrylate,
wherein the copolymer of styrene and methyl methacrylate comprises about 45 wt % to about 55 wt % of styrene and about 45 wt % to about 55 wt % of methyl methacrylate and wherein the particles formed of the copolymer of styrene and methyl methacrylate have an average particle diameter of about 3 μm to about 9 μm and a coefficient of variation (CV) of about 20% to about 40%, as calculated by Equation 1:

Coefficient of variation (CV)=[σ/$M$]×100%   [Equation 1]

where M is an average particle diameter of the copolymer particles and σ is a standard deviation of particle diameters of the copolymer particles,
wherein the thermoplastic resin composition has a transmittance of about 96% or more and a transmittance of about 92% or more, as measured on a 1.0 mm thick specimen and a 2.0 mm thick specimen in accordance with ASTM D1003, respectively; and a luminosity angle of about 3° to about 20° corresponding to half of luminosity at 0°, as measured on a 1.0 mm thick specimen using a goniophotometer, and a luminosity angle of about 10° to about 30° corresponding to half of luminosity at 0°, as measured on a 2.0 mm thick specimen using the goniophotometer.

2. The thermoplastic resin composition according to claim 1, wherein the polycarbonate resin has a weight average molecular weight of about 20,000 g/mol to about 30,000 g/mol.

3. The thermoplastic resin composition according to claim 1, comprising about 1 part by weight to about 2 parts by weight of the particles comprising the copolymer of styrene and methyl methacrylate, the particles comprising the copolymer of styrene and methyl methacrylate having an average particle diameter of about 3 μm to about 7 μm.

4. The thermoplastic resin composition according to claim 3, wherein the particles comprising the copolymer of styrene and methyl methacrylate have an average particle diameter of about 4 μm to about 6 μm.

5. A light diffusion sheet comprising a polycarbonate resin matrix and a light diffusing agent dispersed in the polycarbonate resin matrix,
wherein the light diffusing agent comprises particles comprising a copolymer of styrene and methyl methacrylate,
wherein the copolymer of styrene and methyl methacrylate comprises about 45 wt % to about 55 wt % of styrene and about 45 wt % to about 55 wt % of methyl methacrylate and wherein the particles formed of the copolymer of styrene and methyl methacrylate have an average particle diameter of about 3 μm to about 9 μm and a coefficient of variation (CV) of about 20% to about 40%, as calculated by Equation 1:

Coefficient of variation (CV)=[σ/$M$]×100%   [Equation 1]

where M is an average particle diameter of the copolymer particles and σ is a standard deviation of particle diameters of the copolymer particles,
wherein the composition of the light diffusion sheet has a transmittance of about 96% or more and a transmittance of about 92% or more, as measured on a 1.0 mm thick specimen and a 2.0 mm thick specimen in accordance with ASTM D1003, respectively; and a luminosity angle of about 3° to about 20° corresponding to half of luminosity at 0°, as measured on a 1.0 mm thick specimen using a goniophotometer, and a luminosity angle of about 10° to about 30° corresponding to half of luminosity at 0°, as measured on a 2.0 mm thick specimen using the goniophotometer.

6. The light diffusion sheet according to claim 5, comprising: about 100 parts by weight of the polycarbonate resin matrix; and about 0.5 parts by weight to about 3 parts by weight of the light diffusing agent.

7. The light diffusion sheet according to claim 5, wherein the particles comprising the copolymer of styrene and methyl methacrylate have an average particle diameter of about 3 μm to about 7 μm.

8. The light diffusion sheet according to claim 7, wherein the particles comprising the copolymer of styrene and methyl methacrylate have an average particle diameter of about 4 μm to about 6 μm.

* * * * *